Patented Feb. 17, 1931

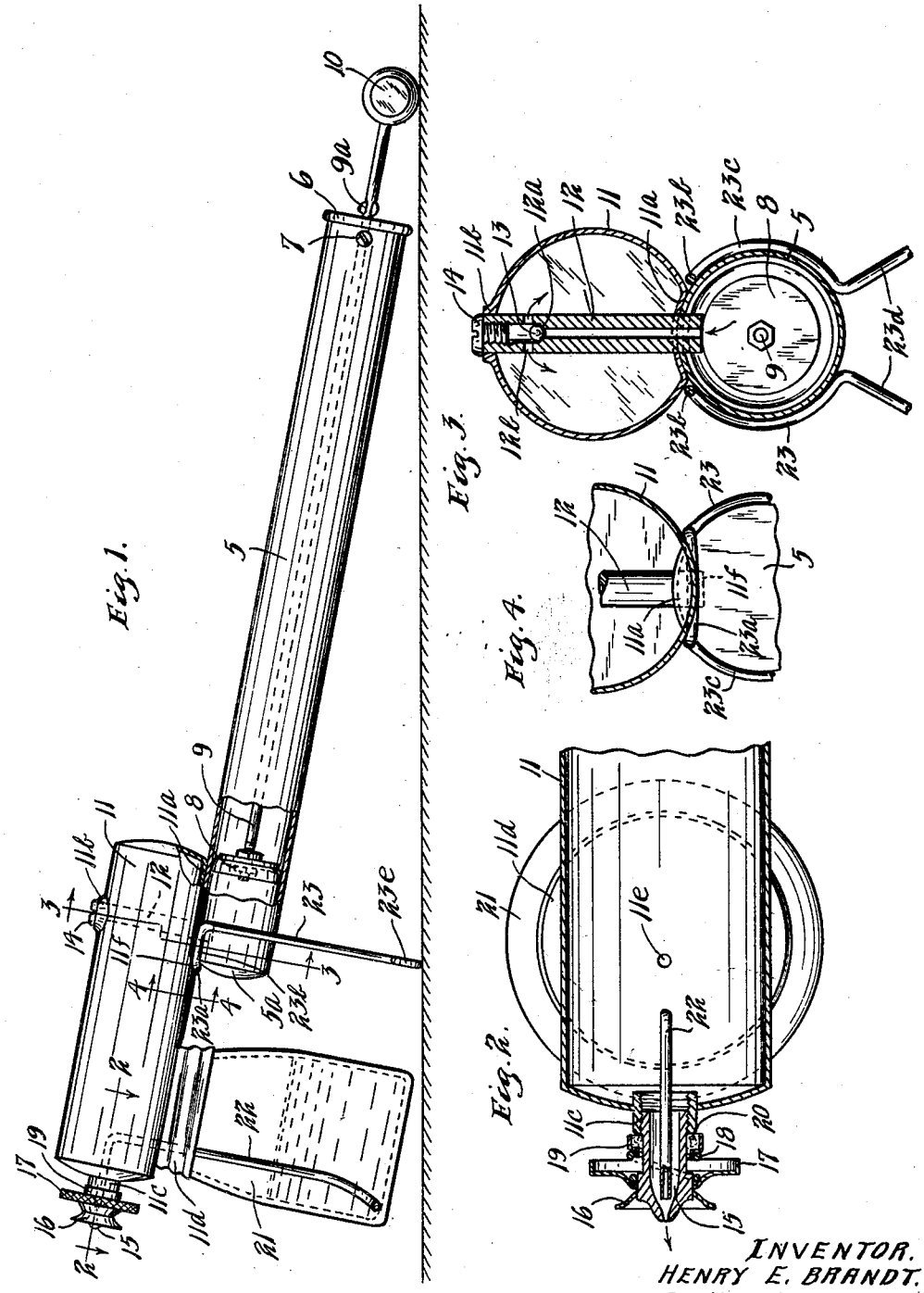

1,792,803

UNITED STATES PATENT OFFICE

HENRY E. BRANDT, OF ST. PAUL, MINNESOTA, ASSIGNOR TO THE DOBBINS MANUFACTURING COMPANY, OF NORTH ST. PAUL, MINNESOTA, A CORPORATION OF SOUTH DAKOTA

SPRAYER FOR LACQUER

Application filed December 31, 1927. Serial No. 243,853.

This invention relates to a spraying device, and while the invention is capable of spraying various liquids, it particularly is designed for spraying a coating material such as lacquer.

It is an object of this invention, therefore, to provide a very simple, compact and efficient form of hand sprayer for a liquid such as lacquer.

It is a further object of the invention to provide such a device comprising an air reservoir or cylinder, a pump cylinder overlapping said air cylinder and secured thereto, a check valve being disposed in the stem extending from the top of the air cylinder through the same and into communication with the pump cylinder so as to be accessible from the top of said air cylinder.

It is another object of the invention to provide a spraying device comprising an air cylinder and a pump cylinder so arranged and attached as to conveniently receive a supporting means.

It is still another object of the invention to provide a simple and compact spraying device comprising an air cylinder and a nozzle of simple and efficient construction carried thereby.

These and other objects and advantages of the invention will be fully set forth in the following description made in connection with the accompanying drawings, in which like reference characters refer to similar parts throughout the several views and in which:—

Fig. 1 is a view in side elevation of the device, certain parts being broken away and others shown in vertical section;

Fig. 2 is a horizontal section taken on line 2—2 of Fig. 1, as indicated by the arrows;

Fig. 3 is a vertical section taken on line 3—3 of Fig. 1 as indicated by the arrows; and Fig. 4 is a vertical section taken on line 4—4 of Fig. 1 as indicated by the arrows, Figs. 2 to 4 being shown on an enlarged scale.

Referring to the drawings, a spraying device is shown comprising a pump portion having a cylinder 5 having a closed end 5a and a removable closure member 6 at its other end which may be held in place by any suitable means such as a screw 7. A piston 8 is movable in the cylinder 5 and while this may be of any desired form, in the embodiment of the invention illustrated it is shown as the usual cup piston having its concave side directed toward the end 5a or the discharge end of said pump. The piston 8 has the piston rod 9 secured thereto, movable through the end member 6 and equipped with the handle 10. The rod 9 is provided adjacent handle 10 with outwardly projecting lugs 9a adapted to engage the outer side of the closure 6 to limit the inward movement of rod 9. A cylinder 5 is secured to an air or pressure cylinder 11 and is disposed below the same, said cylinders overlapping for a short distance. The cylinder 11 is provided on its lower side with a concave or reentrant portion 11a forming a concave recess curved in accordance with the periphery of cylinder 5, which latter cylinder fits within said recess as shown in Fig. 3. A hollow stem or conduit 12 extends vertically through the cylinder 11, said cylinder having a boss 11b thereon bored to receive said stem. The stem 12 extends into the cylinder 5 and has its bore communicating with said latter cylinder. The upper end of the bore in stem 12 is enlarged and has formed therein a valve seat 12a. A ball valve 13 is disposed in said enlarged portion and co-operates with the seat 12a. The upper end of the stem 12 is closed by a headed screw 14 threaded therein. The stem 12 is also provided with openings 12b extending from its outer side to the bore therein above the valve seat 12a. The cylinder 11 is closed at its end above the cylinder 5 and at its other end has an axially disposed hub 11c which is threaded to receive a nozzle member 15. The member 15 has a central passage therethrough which is reduced to quite a small dimension at the end of said member to form the discharge outlet for said nozzle. A flaring cup 16 is secured to the periphery of the nozzle 15 and extends outwardly about the outer end thereof. A shell 17 having a narrow cylindrical and knurled periphery is disposed about said nozzle and has a closed forward wall also secured to the periphery of member 15. A compression spring 18 has one end seated in the recess between member 17 and the periphery of nozzle 15 and at its other end presses against an annular member 19 which is angular in radial cross section and has seated therein packing material 20 disposed about the periphery of nozzle 15 and adapted to abut the end of the hub 11c. While the nozzle comprising parts 15, 16 and 17 may be variously constructed, in the embodiment of the invention illustrated the member 15 is made from a casting or solid piece of material and the members 16 and 17 are stamped or pressed from sheet metal and then soldered or welded to the periphery of member 15. The cylinder 11 has a flange 11d secured to the under side thereof adjacent its forward end which is grooved or threaded to receive a receptacle 21 illustrated as made of glass, which receptacle is thus readily removable. An opening 11e at the bottom of the cylinder 11 affords communication between the same and receptacle 21. A small pipe or tube 22 is threaded in the bottom of cylinder 11 and extends adjacent the bottom of receptacle 21. Tube 22 is bent substantially at a right angle and extends substantially axially of cylinder 11 having its open end disposed in the nozzle 15.

The sprayer comprises a supporting member or bracket 23 which may conveniently be formed of a wire or small rod having a central curved portion 23a disposed in the groove 11f formed in the bottom of cylinder 11 adjacent the end of cylinder 5 and has side portions 23b extending substantially at right angles to the portion 23a and disposed along the cylinders 5 and 11 in the angle formed therebetween. The member 23 is then again bent substantially at a right angle to form the portion 23c extending around the sides of the cylinder 5 in engagement therewith, from which portions the legs 23d extend downwardly in diverging relation and are preferably formed at their ends with reversely curved portions 23e.

In operation the receptacle 21 will be removed and the liquid to be sprayed placed therein, said receptacle then being again fastened in the flange 11d. The nozzle 15 is then adjusted by turning the member 17 to bring the outlet of the nozzle closer to or farther from the end of pipe 22. If it is desired to spray the liquid in a small stream, the nozzle will be screwed into the hub 11c so that the end of the pipe 22 is substantially against the end of the nozzle. If it is desired to form a spray, the nozzle will be adjusted farther from the end of the pipe. The further the nozzle is away, the smaller will be the body of sprayed material. The nozzle in Fig. 2 is shown substantially at its most outward point. It will be seen that spring 18 holds the packing material 20 against the nozzle and end of the hub 11c regardless of the position of the nozzle. The device will now be held in the hands and the handle 10 and plunger 8 reciprocated. Air will be pumped from cylinder 9 and will pass upward through stem 12, lifting the valve 13 and will pass out through the openings 12b in the cylinder 11. Air under pressure will thus accumulate in cylinder 11 and through the opening 11e this pressure will be transferred to receptacle 21 and will act on the liquid therein. This pressure will force the liquid upward through the pipe 22 and it will be directed outwardly toward the opening in the nozzle. The air from cylinder 11 also rushes out through the opening around the end of pipe 22, causing the material to be atomized and sprayed through said nozzle. The valve 13 prevents the air passing back into the pump cylinder 5 as the plunger 8 is moved toward member 6. The valve 13 will seat by gravity.

It will be seen that access may readily be had to the valve 13 and to the interior of the stem 12 by removing the screw 14. The stem 12 is also easily accessible from the top of the cylinder 11.

The shell 16 about nozzle 15 prevents any running from the end of said nozzle onto wheel 17. If a drop of liquid should collect at the end of the nozzle, it will be caught by the shell 16 and prevented from running on to wheel 17 where it would get on to the hands of the operator. The member 17 forms a convenient and comfortable means for adjusting the nozzle.

The member 23 can be readily removed if desired, and also readily placed in position. It will be seen that with this member the sprayer will be held in upright position when placed upon a supporting surface.

From the above description it is seen that applicant has provided a simple and very efficient and compact spraying device. The parts of the device are few, easily made and assembled to form a device which is very comfortably and easily operated. The device has been demonstrated in actual practice and found to be very successful and efficient, and the same is being commercially made.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device of the class described having in combination, an air cylinder having a concave recess in its periphery at its under side adjacent one end, a pump cylinder having one end portion fitting in said recess and secured to said air cylinder, a straight hollow stem having its upper end secured in the top of said air cylinder and extending downwardly through the same and into said pump cylinder, said stem having the opening therein communicating with said pump cylinder, a valve seat in said stem, a ball valve therein co-operating with said seat, said stem having an opening therethrough communicating with said air cylinder above said valve and a removable closure for the upper end of said stem adapted to give access to said ball and valve seat.

2. A device of the class described having in combination, a pump cylinder, an air cylinder overlapping the end of said pump cylinder a short distance, and having a concave recess in its bottom receiving the top portion of said pump cylinder, said air cylinder having a circumferential groove in its bottom adjacent the ends of said pump cylinder, a depending threaded flange beneath its front end, a container removably threaded in said flange and depending therefrom, said air cylinder also having a bracket having a portion disposed in said groove having said portions extending substantially at a right angle to said portion, and disposed in the angles between said cylinders and having portions extending downwardly around the sides of said pump cylinder and diverging to form suporting legs for engaging a supporting surface and holding said container above said surface.

3. A spraying device having a nozzle at one end having a discharge opening therethrough and a flaring shell secured to said nozzle and extending outwardly thereabout.

4. A spraying device having a nozzle at one end comprising a central cylindrical portion, a flaring shell secured to one end of said nozzle and extending outwardly about the discharge end thereof, a cylindrical member for turning said nozzle having an end portion secured to said central portion, said nozzle being adjustable and adapted to be turned by said member.

5. A spraying device having an air cylinder, a nozzle adjustably secured in one end thereof, means for turning said nozzle, a packing means on said nozzle engaging the end of said air cylinder, and resilient means for holding said packing means against said air cylinder in the adjustment of said nozzle.

6. A device of the class described having in combination, a pump cylinder, an air cylinder of comparatively large volume disposed above and longitudinally of said pump cylinder and having a concave recess in its under side in which said pump cylinder fits, a straight hollow stem extending from the top of said air cylinder downwardly therethrough into the front portion of said pump cylinder, a valve seat formed in said stem, said stem having openings above said seat into said air cylinder, a valve movable in said stem adapted to engage said seat, a screw cap closing the upper end of said stem whereby access may be readily had to said valve, a nozzle at the front end of said air cylinder, a liquid containing receptacle carried by said air cylinder and a tube extending from said nozzle into said receptacle.

7. A device of the class described having in combination, an air cylinder having a concave recess in its periphery at its under side adjacent its rear end, a pump cylinder having its front end portion fitting in said recess and secured to said air cylinder, said pump cylinder being of considerably greater length than said air cylinder and having a plunger-operating handle projecting at its rear end, said air cylinder having a threaded cylindrical flange depending from its bottom adjacent its front end, a receptacle removably mounted in said threaded flange and depending therefrom, a nozzle at the front end of said air cylinder, a tube extending from said nozzle into said container for conveying fluid to be sprayed from said container into said nozzle and a leg-forming bracket secured adjacent the front end of said pump cylinder adapted to engage a supporting surface whereby when said handle and said bracket engage the supporting surface said container will be held above said surface.

In testimony whereof I affix my signature.

HENRY E. BRANDT.